United States Patent
Wetzig et al.

(10) Patent No.: US 12,151,306 B2
(45) Date of Patent: Nov. 26, 2024

(54) DEVICE AND METHOD FOR BEAM SHAPING AND BEAM MODULATION DURING LASER MATERIAL PROCESSING

(71) Applicant: Fraunhofer-Gesellschaft Zur Foerderung Der Angewandten Forschung E.V., Munich (DE)

(72) Inventors: Andreas Wetzig, Dresden (DE); Achim Mahrle, Dresden (DE); Patrick Herwig, Dresden (DE); Jan Hauptmann, Dresden (DE); Ramona Eberhardt, Jena (DE); Paul Boettner, Jena (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 777 days.

(21) Appl. No.: 17/297,487

(22) PCT Filed: Nov. 25, 2019

(86) PCT No.: PCT/EP2019/082372
§ 371 (c)(1),
(2) Date: May 27, 2021

(87) PCT Pub. No.: WO2020/109209
PCT Pub. Date: Jun. 4, 2020

(65) Prior Publication Data
US 2022/0037846 A1 Feb. 3, 2022

(30) Foreign Application Priority Data

Nov. 27, 2018 (DE) ............. 10 2018 220 336.9

(51) Int. Cl.
*B23K 26/06* (2014.01)

(52) U.S. Cl.
CPC ...... *B23K 26/0648* (2013.01); *B23K 26/0643* (2013.01)

(58) Field of Classification Search
CPC ............ B23K 26/0648; B23K 26/0643; B23K 26/046; B23K 26/14; B23K 26/242;
(Continued)

(56) References Cited

U.S. PATENT DOCUMENTS

2018/0178320 A1* 6/2018 Webster ............. B23K 26/0648

FOREIGN PATENT DOCUMENTS

DE            10027148        12/2001
DE    10 2008 053 397        12/2009
(Continued)

OTHER PUBLICATIONS

International Search Report.
(Continued)

*Primary Examiner* — Robert G Bachner
(74) *Attorney, Agent, or Firm* — Jacobson Holman PLLC

(57) ABSTRACT

A device and a method for beam shaping and beam movement during laser material processing with a laser beam source (1) for continuously emitting a laser beam (2), a first optical deflection element (3), a second optical deflection element (4), and an optical focusing element (5) arranged between the second optical deflection element (4) and a workpiece surface (7) to be processed. The second optical deflection element (4) is configured to displace a point of incidence of the laser beam (2) on the workpiece surface (7), and the first optical deflection element (3) is configured to alter a position of a focal plane of the laser beam (2) relative to the workpiece surface (7) by means of a translational movement and/or to change an intensity distribution within a beam cross section of the laser beam.

12 Claims, 2 Drawing Sheets

(58) Field of Classification Search
CPC ...... B23K 26/26; B23K 26/38; B23K 26/082; G02B 26/101; G02B 26/105; G02B 27/0983

See application file for complete search history.

(56) References Cited

FOREIGN PATENT DOCUMENTS

| | | |
|---|---|---|
| DE | 10 2009 048 519 | 4/2011 |
| DE | 10 2016 204 578 | 8/2017 |
| DE | 10 2018 106 579 | 9/2019 |
| EP | 3 395 490 | 10/2018 |
| JP | 2002-001565 | 1/2002 |
| JP | 5221560 | 6/2013 |
| WO | 2010/115441 | 10/2010 |

OTHER PUBLICATIONS

DE Examination Report.
Scanlab. "intelliWELD II." May 2, 2015 (May 2, 2015). Retrieved from the Internet: https://www.scanlab.de/sites/ default/files/PDF-Dateien/Produktblaetter/Scan-Systeme/19_ intelliWELD_Scan-can-Systeme.pdf [retrieved on Feb. 3, 2020] XP055664605.
European Office Action.
Schmitt et al. Laser Beam Micro Welding With High Brilliant Fiber Lasers. JLMN Journal of Laser Micro/Nanoengineering, vol. 5, Jan. 1, 2010.

\* cited by examiner

DEVICE AND METHOD FOR BEAM SHAPING AND BEAM MODULATION DURING LASER MATERIAL PROCESSING

BACKGROUND OF THE INVENTION

The present invention relates to a device and to a method for beam shaping and for beam modulation on a laser material machining.

In the ideal case, methods for laser material machining require a three-dimensional distribution of a laser power density adapted to a respective process at a point of action to achieve optimum machining results with respect to quality and process efficiency. In conventional processes with static beam geometries, this is, however, not satisfied as a rule.

Previous approaches for adapting a power density distribution of a laser beam are based either on static approaches or with respect to a flexibility of adaptation possibilities of dynamic methods previously only usable with limitations.

A method is, for example, known from DE 10 2008 053 397 A1 in which an adaptation of a section geometry is carried out by means of beam shaping. It is, however, disadvantageous in this method and in similar methods that only a limited adaptation of the geometry is hereby possible that does not permit any great flexibility.

SUMMARY OF THE INVENTION

It is therefore the underlying object of the present invention to provide a device and a method with which said disadvantages can be avoided, i.e. with which laser material machining can be carried out with as great a flexibility as possible.

This object is achieved in accordance with the invention by a device in accordance with the claims.

A device for beam shaping and beam movement on a laser material machining has a laser beam source for a continuous emission of a laser beam, a beam shaping element, an optical deflection element, and a focusing element arranged between the optical deflection element and a workpiece surface to be processed. The optical deflection element is configured to displace a point of incidence of the laser beam on the workpiece surface. The beam shaping element is configured to change a position of a focal plane of the laser beam relative to the workpiece surface by a translatory movement and/or is configured to change an intensity distribution or a lateral energy distribution within a beam cross-section of the laser beam.

A three-dimensional setting or a spatial positioning of the focused laser beam or of the lateral energy distribution within the beam cross-section is made possible with respect to the workpiece to be processed by using the beam shaping element and the optical deflection element. The deflection element here permits an integral of the beam intensity and a local interaction time to be influenced. A defined two-dimensional energy density distribution in the form of any desired Lissajous figures can be achieved on the workpiece surface in that the incident laser beam is deflected by the optical deflection element such that the point of incidence can be varied. In addition, the position of the focal plane in the beam propagation direction can be changed by a simple translatory relative movement of the beam shaping element so that an energy distribution in the form of any desired three-dimensional Lissajous figure can be defined. An extended translatory relative movement of the beam shaping element furthermore makes it possible to adapt the intensity distribution over the beam cross-section as desired within the arbitrary three-dimensional Lissajous figure. Only the beam shaping element is typically positioned in a translatory application-relevant manner to set the focal plane or a penetration depth while all the other components of the device remain locally fixed or spatially fixed. A continuous material machining is achieved by the user of a continuous wave, that is of a cw laser beam source.

The optical deflection element can be configured as rotatable about two axes that are perpendicular to one another to achieve a simple change of the point of incidence of the laser beam on the workpiece surface.

Provision can be made that at least one of the axes about which the optical deflection element is rotatable is collinear to the laser beam. A simple geometrical design is hereby implemented that contributes to a defined adjustability.

The optical deflection element typically has one or two elements that reflect the laser beam, preferably mirrors, to enable a defined scanning. Each of the elements that reflect the laser beam can here be rotatable about one of the two axes that are perpendicular to one another. Alternatively or additionally, each of the elements that reflect the laser beam can also be designed as translatorily movable and/or as deformable in at least two spatial directions.

The beam shaping element is typically linearly movable or deformable along an axis, with this axis being tilted with respect to the optical axis of the incident light beam and to the optical axis of the deflected light beam. The tilt preferably amounts to between 35° and 55°, particularly preferably to 45°. The location of the focal plane can be changed fast and reliably by this arrangement that is also called a "fast z-axis". The beam shaping element that as a rule has an element such as a mirror that reflects the laser beam is typically also tilted by said angle with respect to the workpiece surface to be processed.

In a method for beam shaping and beam movement on a laser material machining a continuously emitted laser beam from a laser beam source is directed onto the workpiece surface via a beam shaping element, an optical deflection element, and an optical focusing element arranged between the optical deflection element and a workpiece surface to be processed. A point of incidence of the laser beam on the workpiece surface is displaced by the optical deflection element and a location of the focal plane of the laser beam relative to the workpiece surface is changed by a translatory movement of the beam shaping element and/or an intensity distribution within the beam cross-section is changed by the beam shaping element, for example by a translatory movement.

Provision can be made that the laser beam is emitted by the laser beam source at a laser power of up to 20 kW. preferably of up to 10 kW, particularly preferably of up to 5 kW.

The beam shaping element and/or the optical deflection element are typically moved in an oscillating manner by a control/regulation unit in a frequency range between 1 Hz and 100 kHz to set desired three-dimensional Lissajous figures. Said control/regulation unit can generally be configured for the control or regulation of the described method or of the described device.

The laser power can be modulated by the control/regulation unit in a frequency range between 1 Hz and 10 MHz so that temporally variable intensity densities can be generated.

The method described is typically a laser cutting method or a laser welding method.

Provision can alternatively or additionally be made that a beam diameter of the laser beam is oscillated at a frequency between 1 Hz and 100 kHz, that is, it is periodically increased and decreased in size. Provision can also be made that a beam waist diameter of the laser beam is oscillated in a range between $0.5 \cdot d_F$ and $2 \cdot d_F$ of a fixed nominal beam diameter. The nominal beam waist diameter can here be fixed in an application specific manner and can in particular be between 100 µm and 200 µm. The machining properties can be set as desired by the periodic increasing and decreasing in size of the beam diameter. The beam diameter is here typically identical with respect to its size at a laser beam cross-section of minimal diameter to the beam waist diameter.

The method described can be carried out using the device described, i.e. the device described is configured to carry out the described method.

DESCRIPTION OF THE DRAWINGS

Embodiments of the invention are shown in the drawings and will be explained in the following with reference to FIGS. 1 to 3.

There are shown.

DETAILED DESCRIPTION OF THE INVENTION

Figure 1:
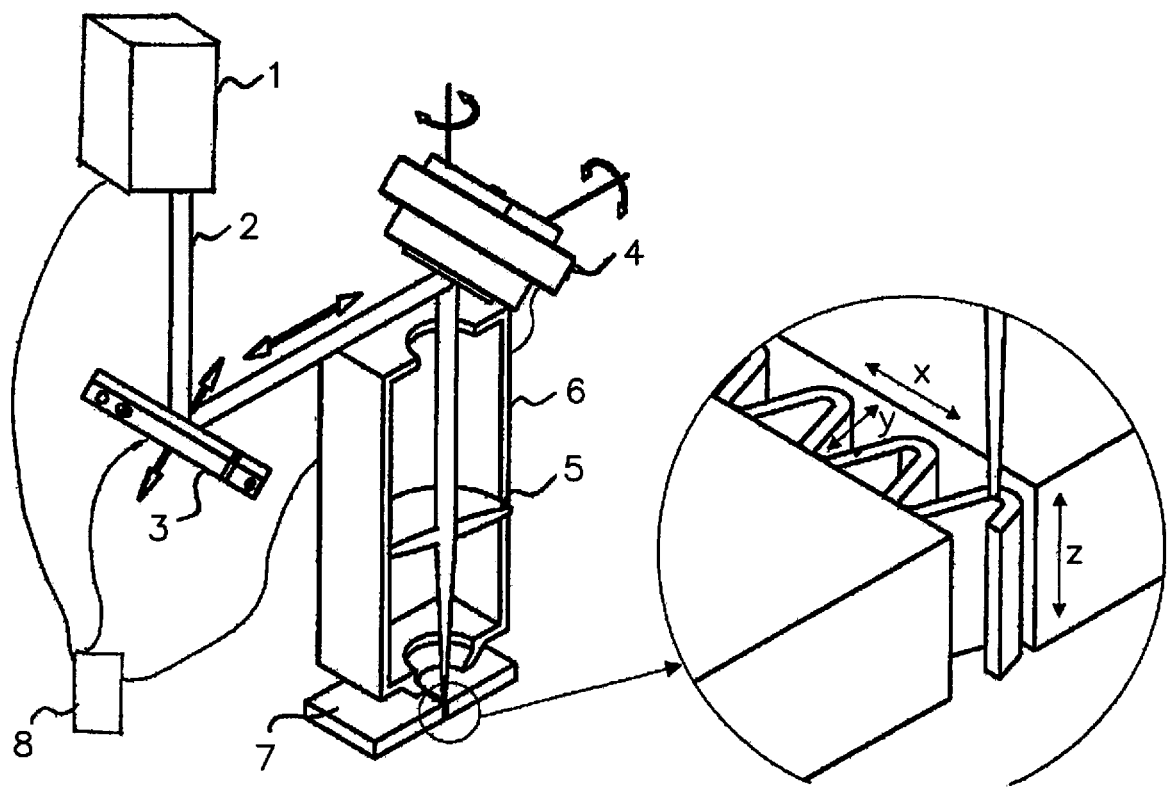
FIG. 1 a schematic perspective view of a device for beam shaping.

FIG. 1 shows in a schematic perspective view a device for beam shaping or beam movement. A laser beam source 1, in the present case a cw laser beam source, that is a laser beam source emitting a continuous non-pulsed beam, emits a laser beam 2 that can be emitted both in the electromagnetic wavelength range of visible radiation, infrared radiation, or ultraviolet radiation. The laser beam 2 is deflected by reflection, by 90° in the embodiment shown, in the direction of an optical deflection element 4 by a movable mirror as the beam shaping element 3.

The optical deflection element 4 is rotatable about two axes that are perpendicular to one another and is likewise a mirror in the embodiment shown. In further embodiments, the optical deflection element 4 can, however, also be made up of two mirrors. The optical deflection element 4 deflects the laser beam 2 in the direction of a workpiece surface 7 to be processed. A focusing element 5, a spherical or aspherical lens in the embodiment shown, is arranged in a housing 6 between the workpiece surface 7 and the optical deflection element 4 and the laser beam 2 is focused by it on the workpiece surface 7 to be processed.

The laser beam source 1 and the movements of the beam shaping element 3 and of the optical deflection element 4 are monitored by a control/regulation unit 8 that is in electrical or electronic connection with said elements for this purpose. A movement of the laser beam 2 on the workpiece surface 7 can thus take place in x-y-direction by the optical deflection element 4, as shown in enlarged form in the right part of FIG. 1. At least one of the axes about which the movement takes place is here in parallel with or collinear to the incident light beam 2. A location of a focal plane relative to the workpiece surface 7 can be changed by a translatory movement of the beam shaping element 3 along the axis indicated by arrows in FIG. 1 so that an adjustment along a z-axis, that is likewise shown in the right part of FIG. 1, is made possible. This axis, along which a periodic movement of the beam shaping element 3 typically takes place, is respectively tilted in the embodiment shown in FIG. 1 by 45° with respect to the incident and the reflected light beam 2, that is, in parallel with a surface normal of the mirror. The beam shaping element 3 in the embodiment shown exclusively serves a setting of the z-axis.

The control/regulation unit 8 can vary a laser power of the laser beam 2 to provide a more flexible design to the method carried out by the device shown, typically a laser beam cutting process or a laser beam welding process. This as a rule takes place in an oscillating manner at a frequency between 1 Hz and 10 MHz. The laser beam 2 is, however, typically emitted by the laser beam source 1 at a laser power of 5 kW to 20 kW. Provision can equally be made that the control/regulation unit 8 modulates the movement of the laser beam 2 on the workpiece surface 7 in an oscillating manner in at least one of the axes, that is the x-axis, the y-axis, and/or the z-axis, at a frequency between 1 Hz and 100 kHz. In the embodiment shown, a feed of the workpiece takes place in parallel with the x-axis. In further embodiments, the feed direction can naturally also be aligned differently.

The laser beam 2 shaped and focused with the aid of the beam shaping element 3 and of the optical deflection element 4 can thus be moved practically independently of one another in all three spatial directions in a frequency range dependent on the respective application at amplitudes between $0.01 \, d_F$ and $2 \, d_{PZ}$ (with $d_F$ designating the diameter of the beam waist (focal plane) of the oscillating beam and $d_{PZ}$ designating the characteristic dimensions, that is length, width, and/or depth of a machining zone). An effective volume of the laser beam 2 is hereby positioned in an oscillatory manner temporally and spatially in a manner adapted to the machining process and the effective range is thus adapted to a special machining process on a possible inclusion of additional parameters for process monitoring to set practically any desired three-dimensional, temporally variable power density distributions along a machining contour and in interaction with temporarily varying marginal conditions of the process zone. In principle, it is also possible to regulate an oscillation amplitude of a component in dependence on a current feed vector or on a different component in real time by the control/regulation unit 8.

Variations of characteristic local interaction times as a result of temporally varying oscillation speeds can be compensated by the alternatively or additionally occurring modulation of the laser power and a further process optimization can be achieved. The beam power is here typically modulated in dependence on the current feed of the respectively addressed component of the oscillation movement.

This oscillating movement of the active volume of the laser beam 2 can be technically achieved by a mechanical, electromechanical, or adaptive beam shaping element 3 and/or by a mechanical, electromechanical, electrostatic, or piezo-driven optical deflection element 4. In an embodiment, the oscillating movement in the machining direction x and transversely to the machining direction y is implemented either with the aid of two galvonometrically drive scanner mirrors or with the aid of a single mirror that is movable in two directions of rotation and that is servo-driven or piezo-driven. The single mirror can here be a MEMS (micro electromechanical system) mirror. The beam shaping element 3 can in particular be configured as an adaptive mirror, that is as a further optical deflection element, that can change a surface shape from planar to convex and/or concave pneumatically, electrostatically, electromechanically, or in a piezo-driven manner and thus influences the beam section and the optical path.

It is possible in a further embodiment to use polygon wheels for the beam deflection in the event of special preferred directions of a special process. The oscillation movement in the z-direction can take place, for example, by means of a piezo-driven adaptive deflection mirror. In addition, a respective two-dimensional beam shaping in the x- and z-directions or in the y- and z-directions is also permitted in that the oscillation amplitude and/or oscillation frequency of the remaining direction component is zeroed.

As a result of the implementation of a spatially three-dimensional and temporarily oscillatory positioning of the effective active volume of the laser beam 2, it is made possible to influence the process mechanisms running in the workpieces to be processed by the laser beam 2 such that optimal machining results are achieved or such that changes of the process routines corresponding to a normal state as a result of interference processes and/or changed marginal process conditions can be compensated by a dynamic adaptation of the oscillation parameters.

It is possible in this respect that this adaptation takes place in an automated manner by a sensor-controlled regulation mechanism by the control/regulation unit 8. These extended adaptation and regulation possibilities have an advantageous effect on the achievable machining results in the application field of laser material machining.

The following advantages are, for example, expected for laser beam cutting (fusion cutting and flame cutting):
1. The x-z-oscillation allows the angle of the cutting front to be set and to be adapted at any time during the cutting process. Optimal absorption relationships can thus be achieved, whereby the process efficiency can be increased.
2. The y-z-oscillation allows the cutting gap width to be set in a sensible range dependent on the sheet metal thickness of 0.01b<b<0.2b (sheet metal thickness b) and to change it at any time during the cutting process.
3. Parallel cutting edges can be set with the aid of the y-z-oscillation.
4. The oscillation in three spatial directions allows the angle of the cutting front to be set and to be changed with the simultaneous possibility of a settable or changeable cutting gap width. It is thereby possible to generate an optimal interaction area for the oxidation reaction in the case of flame cutting. In the case of fusion cutting, the overflow of the fused material is improved in interaction with the cutting gas for an optimal geometry of the cutting front. Burr formation is thereby reduced or avoided and the roughness of the cutting edges is alleviated.
5. A variety of control possibilities for the piercing process result.

The following advantages are expected for the laser beam welding:
1. The x-z-oscillation allows a front angle of a laser induced steam capillary to be set in the case of penetration welding with adapted oscillation amplitudes and to adapt it at any time during the welding process. Optimal absorption relationships can thus be achieved, whereby the process efficiency can be increased or a greater stability of the capillary is achieved.
2. The y-z-oscillation allows a width of a weld seam to be adapted to technological demands with respect to a binding width and a seam strength and to change it at any time during the welding process.
3. Parallel weld seam flanks can be set with the aid of y-z-oscillations in the case of penetration.
4. The oscillation in three spatial directions allows the geometry of the laser induced steam capillary to be shaped in a productive manner and to be adapted during the process with adapted frequency and amplitude values.

The oscillation in three spatial directions allows the geometry of the weld pool to be set in a productive manner and to be adapted during the process with adapted frequency and amplitude values. Relevant technological properties of the weld seam and their mechanical characteristic values can thus be improved.

In further embodiments, the described method or the described device can also be used for additive production.

Figure 2:
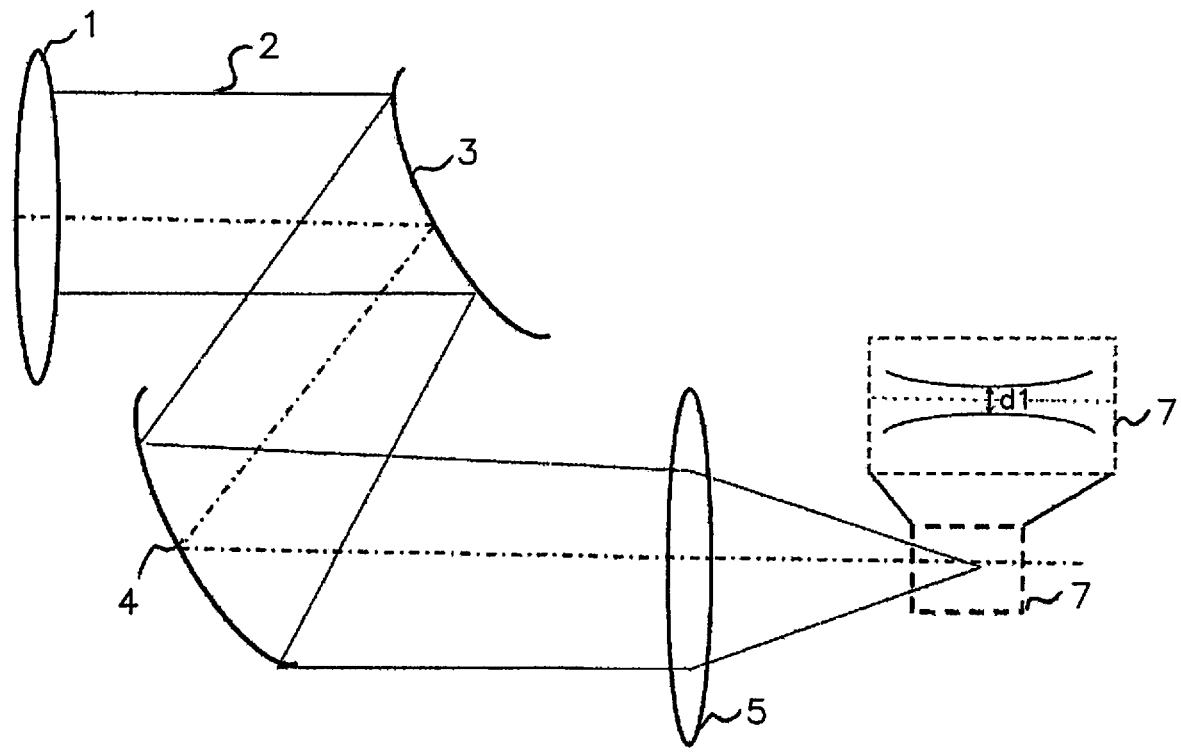
FIG. 2 a schematic lateral view of the device.

FIG. 2 shows in a schematic side view the optical path of the device in which the laser beam 2 is first incident on a convex beam shaping element 3, is reflected from there onto a concavely formed deflection element 4, and moves from it through the focusing element 5 onto the workpiece surface 7. Repeating features are provided with identical reference numerals in this Figure and also in the following Figure. In the optical path shown in FIG. 2, a relatively small beam width or a relatively small beam diameter d1 is formed that can also be called a beam waist diameter. The beam width of the focused laser beam 2 can be oscillated in a frequency range of 1 Hz to 100 kHz in a specific size range, for example between a focal diameter of 100 μm and 200 μm. This is done by the arrangement of the beam shaping element 3 in the optical path and by its movement shown in FIG. 1.

Figure 3:
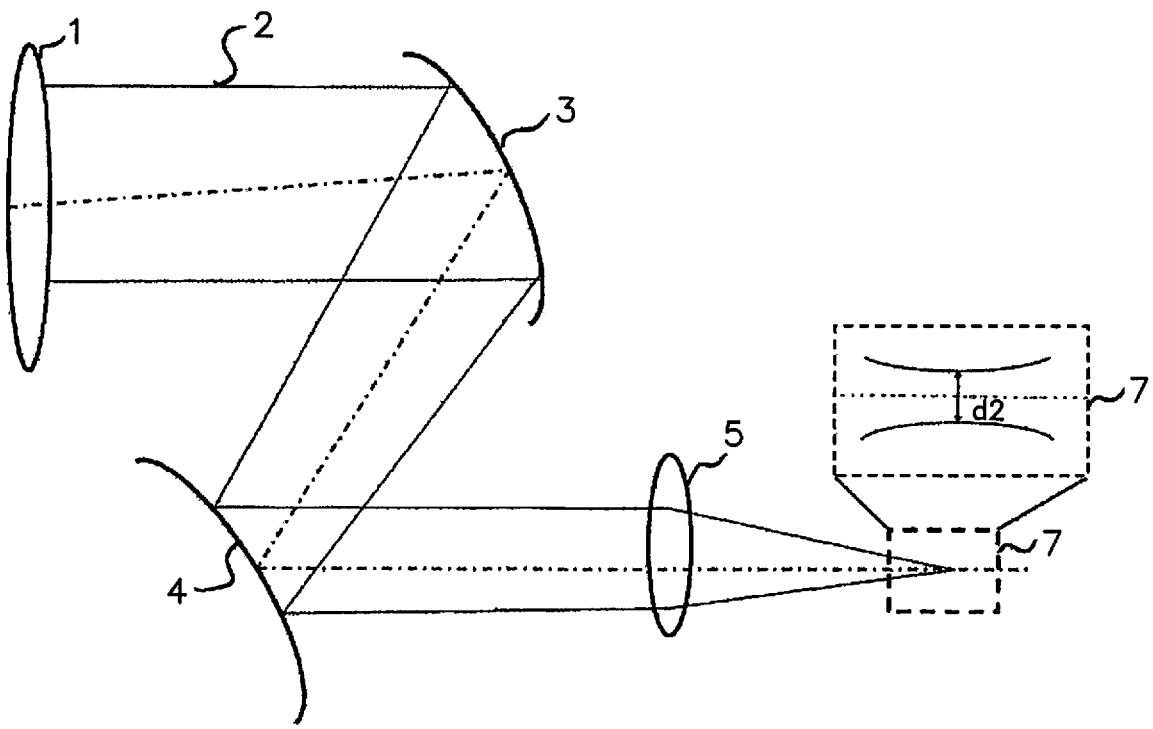
FIG. 3 a view corresponding to FIG. 2 of an alternative design of the optical path shown in FIG. 2.

In FIG. 3, a further embodiment is shown in a view corresponding to FIG. 2, in which embodiment the beam shaping element 3 is now concave while the deflection element 4 is convex. A wider beam diameter d2 is thus produced that, as in the embodiment shown in FIG. 2, can be varied with respect to its width.

Only features of the different embodiments disclosed in the embodiment examples can be combined with one another and claimed individually.

The invention claimed is:

1. A device for beam shaping and beam modulation during laser material machining comprising
   a laser beam source for a continuous emission of a laser beam;
   a beam shaping element;
   an optical deflection element; and
   an optical focusing element arranged between the optical deflection element and a workpiece surface to be processed, wherein
   the optical deflection element is configured to displace a point of incidence of the laser beam on the workpiece surface; and
   the beam shaping element is configured to change a location of a focal plane of the laser beam relative to the workpiece surface by a translatory movement or to change an intensity distribution within a beam cross-section of the laser beam; and
   a control regulation unit configured to modulate the movement of the laser beam on the workpiece surface in an oscillating manner in at least two directional components simultaneously, one of which runs parallel to the optical axis of the focusing element, in a frequency range between 1 Hz and 100 kHz.

2. The device in accordance with claim 1, wherein the optical deflection element is configured as rotatable about two axes that are perpendicular to one another.

3. A device in accordance with claim 2, wherein at least one of the axes about which the optical deflection element is rotatable is collinear to the laser beam.

4. The device in accordance with claim 1, wherein the optical deflection element has two elements that reflect the laser beam.

5. The device in accordance with claim 1, wherein the beam shaping element is linearly movable or deformable along an axis that is tilted with respect to an optical axis of an incident laser beam and of a deflected laser beam by 35° to 55°.

6. A method for beam shaping and beam modulation during laser material machining consisting of the steps:
 directing a continuously emitted laser beam onto a workpiece surface from a laser beam source via a beam shaping element;
 arranging an optical deflection element and
 an optical focusing element between an optical deflection element and the workpiece surface to be processed;
 displacing a point of incidence of the laser beam on the workpiece surface by the optical deflection element; and
 changing a location of a focal plane of the laser beam relative to the workpiece surface by a translatory movement of the beam shaping element or an intensity distribution within the beam cross-section; and
 modulating the movement of the laser beam on the workpiece surface in an oscillating manner by a control/regulation unit in at least two directional components simultaneously, one of which runs parallel to the optical axis of the focusing element, in a frequency range between 1 Hz and 100 kHz.

7. The method in accordance with claim 6, wherein the laser beam is emitted by the laser beam source at a laser power of up to 20 kW.

8. The method in accordance with claim 6, wherein the beam shaping element or the optical deflection element is moved in an oscillating manner by a control/regulation unit in a frequency range between 1 Hz and 100 KHz.

9. The method in accordance with claim 6, wherein the laser power is modulated by a control/regulation unit in a frequency range between 1 Hz and 10 MHz.

10. The method in accordance with claim 6, wherein the method is a laser cutting method or a laser welding method.

11. The method in accordance with claim 6, wherein a beam diameter of the laser beam is oscillated at a frequency between 1 Hz and 100 kHz.

12. The method in accordance with claim 6, wherein a beam waist diameter of the laser beam is oscillated in a range between $0.5 \cdot d_F$ and $2 \cdot d_F$ of a fixed nominal beam waist diameter.

* * * * *